United States Patent [19]
Erickson et al.

[11] 3,803,841
[45] Apr. 16, 1974

[54] STEERING ACTUATED MOTOR DISPLACEMENT CONTROL VALVE

[75] Inventors: Rodney R. Erickson, Joliet; Gordon W. Johnson, Peoria, both of Ill.

[73] Assignee: Caterpillar Tractor Co., Peoria, Ill.

[22] Filed: July 10, 1972

[21] Appl. No.: 270,269

[52] U.S. Cl............... 60/421, 60/428, 60/484, 60/491, 180/6.48
[51] Int. Cl............... F16h 39/46, B62d 11/04
[58] Field of Search....... 180/6.48; 60/19, 325, 420, 60/421, 427, 428, 433, 471, 484, 491

[56] References Cited
UNITED STATES PATENTS

| 3,247,919 | 4/1966 | Moon | 60/484 X |
| 3,279,172 | 10/1966 | Kudo et al. | 60/484 X |
| 3,381,472 | 5/1968 | Brown et al. | 60/325 |
| 3,500,633 | 3/1970 | Livezey | 60/19 |
| 3,526,288 | 9/1970 | Cryder et al. | 180/6.48 |

Primary Examiner—Edgar W. Geoghegan
Attorney, Agent, or Firm—Fryer, Tjensvold, Phillips & Lempio

[57] ABSTRACT

A track drive vehicle incorporating a pair of hydrostatic transmissions in the drive train for individual track drive is provided with a control system that is responsive to the vehicle steering control to automatically proportion transmission setting during a turn to prevent turns at excessive speeds and also to prevent over-pressurization of the hydrostatic drive system.

13 Claims, 3 Drawing Figures

STEERING ACTUATED MOTOR DISPLACEMENT CONTROL VALVE

BACKGROUND OF THE INVENTION

The present invention relates to hydrostatic transmission controls and pertains more particularly to control means that are operative during drive steering of a vehicle to adjust the torque and speed output to avoid excessive speed during a turn and to prevent over-pressurization of the hydrostatic system.

Reference is made to U.S. Pats. Nos. 3,381,472, issued May 7, 1968 to Brown, et al and 3,477,225, issued Nov. 11, 1969 to Cryder, et al, for background into hydrostatic transmission and development history as well as an indication of the current state of the art.

Numerous systems have proposed controlling hydrostatic transmissions; however, few have been directed to the unique problems of coordinated control of a pair of hydrostatic transmissions operatively connected for driving a pair of transversely spaced ground engaging means for vehicle propulsion. Such an arrangement would be provided, for example, in a track drive vehicle wherein each track is separately driven. Two wheeled tractors of the type for pulling scrapers may also employ an arrangement such as herein described.

The above described arrangement presents a special problem in track drive vehicles wherein turning is accomplished by varying the drive speed to each of separately driven tracks. During full speed pivot and spot turns of the vehicle, very high manifold pressures occur. This is due to the dragging effect of the grouser shoes digging into the ground, resulting in the requirement of greater force to turn the vehicle. Excessive manifold pressures cause a large volume of fluid to by-pass over the high pressure relief valves, resulting in excessive heat build-up and a waste of horsepower.

Even more important, however, is the problem of safety. The use of infinitely variable transmissions, such as the hydrostatic transmission, permits heavy duty vehicles to rapidly attain high translation speeds during operation. While such high speed operation greatly improves productivity, it also increases the hazards of normal operation of such vehicles where turning is required.

The hazards of high speed operation of heavy duty vehicles result primarily from the high inertia of such vehicles and from high center of gravity when either loaded or unloaded. These conditions are especially critical when turns are being negotiated. For example, the high inertia of such vehicles results in a need for good traction and high torque in order to turn the vehicle. The absence of either of these factors can result in loss of control of the vehicle in a high speed turn.

Some vehicles have a high center of gravity when loaded, while others have a high center of gravity when unloaded. In either case, the high center of gravity can result in the vehicle tipping over if a turn is attempted at high speed.

SUMMARY OF THE INVENTION

It is a primary object of the present invention to provide an automatic control system for providing optimum vehicle speed and utilization of engine horsepower during pivot and spot turns.

Another object of the present invention is to provide a control system for an infinitely variable transmission system that is operative to properly proportion engine output between the separate tracks of the vehicle drive for controlled high speed turns.

A further object of the present invention is to provide a control system for controlling hydrostatically driven track vehicles for continuously powered controlled radius pivot and spot turns.

In accordance with a primary aspect of the present invention, a vehicle utilizing a pair of hydrostatic transmissions to drive separate wheels of a vehicle is provided with a control system that automatically proportions torque and speed between the two transmissions during high speed turns. The control system is responsive to both the speed control signal and the rate of turn signal of a control system to automatically adjust the speed ratio of the transmission.

BRIEF DESCRIPTION OF THE DRAWINGS

The above and other objects and advantages of the present invention will become apparent from the following description when read in conjunction with the accompanying drawings wherein.

DETAILED DESCRIPTION OF PREFERRED EMBODIMENTS

Figure 1:
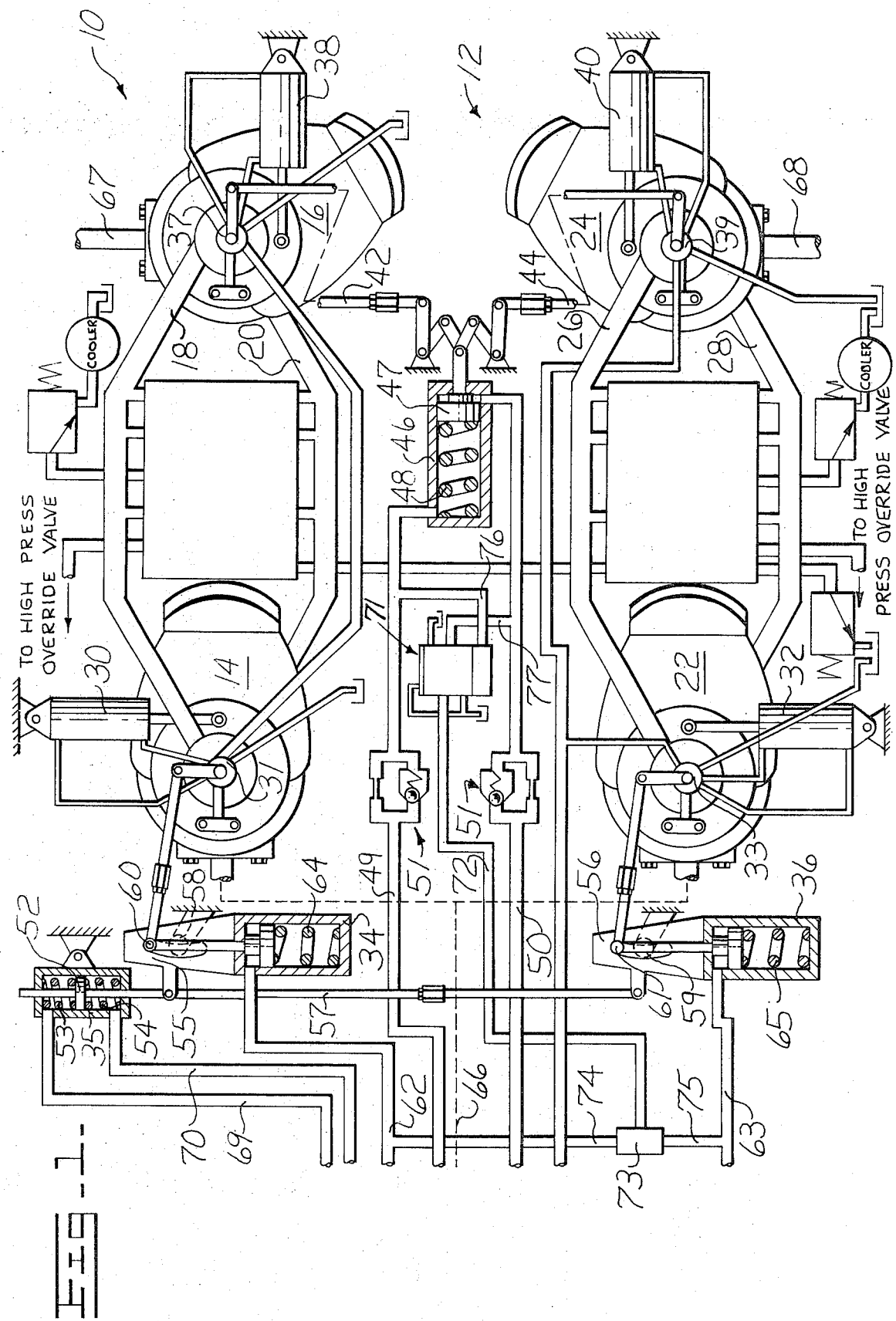
FIG. 1 is a diagrammatic illustration of a control system in accordance with the present invention.

Referring now to the drawings, and with particular reference to FIG. 1, there is illustrated a hydrostatic drive system employing a control system in accordance with the present invention. The illustrated embodiment comprises a pair of hydrostatic transmissions 10 and 12, each of which is operatively connected to be driven by the same engine (not shown) and are operatively connected to transmit torque to separate drive wheels or tracks for translation of a vehicle. The hydrostatic transmission 10 comprises a variable displacement pump 14 and a variable displacement motor 16 operatively connected together by means of a hydraulic loop comprising a conduit 18 and a conduit 20. The hydrostatic transmission 12 is similarly constructed and comprises a variable displacement pump 22 connected to a variable displacement motor 24 by means of conduits 26 and 28. The ratio of input to output of each transmission is governed by the displacement setting of the pump and motor of the transmission.

The displacement of each of the pumps is varied by means of hydraulic motors or pump actuators 30 and 32 which are operative to swing the pumps from zero displacement to maximum displacement to either side of center to provide forward and reverse as well as a certain degree of speed control. The pump actuators 30 and 32 are controlled by servo valve units 31 and 33 with the servo valves being actuated by a servo actuator or pilot cylinder 35 or individually by actuators 34 and 36 which are responsive to the control pressure in the steering control system, as will be described later.

The displacement of the motors 16 and 24 is controlled by linear motors or motor actuators 38 and 40 which are operative to vary the displacement of the motors and thereby vary the speed and/or torque output thereof. The motor actuators are controlled by servo valve units 37 and 39 which are interconnected through the control system by means of links 42 and 44 and actuated by a suitable linear actuating motor or pilot cylinder 46. The servo valve for controlling the displacement of the motors 16 and 24 is interconnected for simultaneous activation through the linkage to actuating motor 46, which is responsive to a speed control selector (not shown) to vary the speed ratio of the transmission.

Hydraulic fluid for operation of the control system is preferably supplied by a fixed displacement pump (not shown) directly dirven from the vehicle engine, drawing fluid from a sump supplying it through a conduit system to the various control valves of the system.

The hydraulic motors 16 and 24 are interconnected by the control system and synchronized to operate together to maintain a precise and synchronized output from each of the transmissions, provided, of course, that the pumps 14 and 22 are similarly synchronized for the same output. The motors 16 and 24 are synchronized and interconnected to operate together when swinging from maximum to minimum displacement and vice versa under the action of the speed control actuating motor 46. The actuating motor 46 includes a piston 47 operatively connected through the linkage means 42 and 44 to the servo valves 37 and 39 of the motors. The piston 47 is biased to its extended position by means of a spring 48 with this position in the illustrated embodiment representing the maximum displacement of the motors. The speed control motor 46 is responsive to a speed control signal in the form of pressurized fluid introduced by way of control lines 49 and 50 to position the piston 47 and to thereby position the motors 16 and 24 for corresponding displacement or speed ratio. Each of the control lines 49 and 50 is provided with a suitable flow control device comprising a parallel check valve and/or a restriction to smooth out the actuation of the motor pilot cylinder or actuating motor 46.

The pumps 14 and 22 are similarly controlled by suitable actuating or servo motor 35 comprising a pilot cylinder in which a piston 52 is biased to a center position by means of springs 53 and 54 and is connected to a pair of lever arm or bell crank assemblies 55 and 56, each of which carries individual pilot control motors 34 and 36 and are connected together by means of a tie rod 57. The pilot control motor 35 is responsive to a differential pressure acting on piston 52 to act through the linkage arrangement on the servo valves 31 and 33 to thereby control the displacement of the pumps 14 and 22. As can be seen, the piston 52 may move in either direction and thus tilt or move the linkage in the servo valve units in either direction and consequently, is able to swivel the pumps 14 and 22 over center to either side to thereby direct fluid in either direction around the loop and consequently cause the transmissions to run in either the forward or reverse direction in relation to the engine input. The linkage is arranged to provide coordinated control of the two pumps to synchronize the output of the pumps to have position correspondence.

The bell crank assemblies 55 and 56 each are pivotally mounted to a fixed pivot point 58 and 59 respectively and each includes a variable pivot point 60 and 61 to vary the lever arm for actuating the respective lever arm. The distance of the pivot point or pin connection 60 from the pivot point 58 defines the degree of movement translated to the servo valve unit 31 and hence the positioning of the pump. The direction of movement for a given direction of movement of the pilot control cylinder 35 is determined by its position on either side of the fixed pivot point 58, which, of course, together with the distance from the point 58, is determined by pilot actuator 34.

These pilot cylinders or actuating means 34 and 36 are effective in conjunction with the above described variable arm linkage means to effect steering of the system. Actuation of either one of these pilot control cylinders 34 or 36 results in a change of the speed output of one transmission. These pilot control cylinders are operated by differential pressure established in each case by means of fluid pressure introduced by hydraulic lines 62 and 63 and opposed by means of springs 64 and 65 acting on the respective pistons.

Operation of the illustrated embodiment can best be understood by understanding that the system as illustrated in FIG. 1 is in the neutral position, that is, input drive at 66 from a vehicle engine will be translated to the input of both of the pumps 14 and 22, but will result in no rotational output at the transmission output shafts 67 and 68. Hydrostatic transmission, as in the instant case in which both pump and the motor are variable displacement units, must have a control system for proper sequencing of the pump and motor relative to one another in order to obtain efficient operation of the transmission.

In a properly sequenced transmission, the pump will have zero displacement and a zero speed condition and the motor will be at its maximum displacement. For acceleration of the vehicle, the pump is increased in displacement toward a maximum displacement while the motor remains at its maximum displacement so it will develop maximum torque at minimum pressure for accelerating the vehicle.

In order to accelerate the vehicle, fluid pressure is introduced to the speed control servo motor 35 by either of hydraulic lines 69 or 70 to displace servo piston 52 by means of differential pressure acting thereon and thereby translate this movement by way of bell crank arrangements or assemblies 55 and 56 to the rotary servo valve units 31 and 33 to thereby gradually increase the displacement of pumps 14 and 22. The displacement of the pumps will start a flow of fluid around the loops 18, 20, 26, 28, whereby the fluid will act on motors 16 and 24 to start them in motion. The pumps are increased in displacement toward a maximum displacement while the motors remain at their maximum displacements so that they will develop maximum torque at minimum pressures for accelerating the vehicle.

After the pump of a typical transmission has its maximum displacement, the vehicle is at its maximum speed unless the motor is also variable displacement. With variable displacement motors, as in the illustrated embodiment, the displacement of the motors is gradually decreased by introducing hydraulic fluid by way of hydraulic line 50 to act on and displace the servo piston 47 which translates the movement thereon by way of the linkage 42, 44 to the servo units 37 and 39 to thereby move the motors to their minimum displacement and the vehicle to its maximum speed. Steering of the vehicle is accomplished by altering the output speed of one of the shafts 67 or 68 with respect to the other. In essence, this is accomplished by changing the speed ratio of one of the transmissions with respect to the other. This is accomplished simply by activating one of the steering servo motors 34 or 36 simply by the introduction of increased fluid pressure through either one of hydraulic lines 62 or 63. If the pressure in line 62 were increased, for example, movement of the servo piston of the servo motor 34 would result in a pivot point 60 being moved downward along the slot formed in member 55 which slot would, in the operative position, be at an angle to that shown. This would result in a camming action and in movement of the pivot point 60 to the right or left, thus actuating the servo valve unit 31 and resulting in the pump 14 being swiveled to a lower displacement than that of pump 22, with a resulting reduction in the output speed of the drive axle 67. This would result in the vehicle being turned in the direction of the slower drive wheel.

Because of the high speeds that vehicles incorporating the above type speed or transmission systems can attain, steering responsive speed control means are provided for reducing the transmission output speeds from high levels in response to high levels of turning signal. In the present invention or embodiment, the steering responsive speed control means comprises a valve assembly 71 communicating by way of a hydraulic line 72, a shuttle valve 73, and hydraulic lines 74 and 75 with the steering control lines 62 and 63. The valve assembly 71 also communicates by way of hydraulic lines 76 and 77 with the motor speed control lines 49 and 50 which communicate with the motor speed control servo 46 for control thereof.

Figure 2:
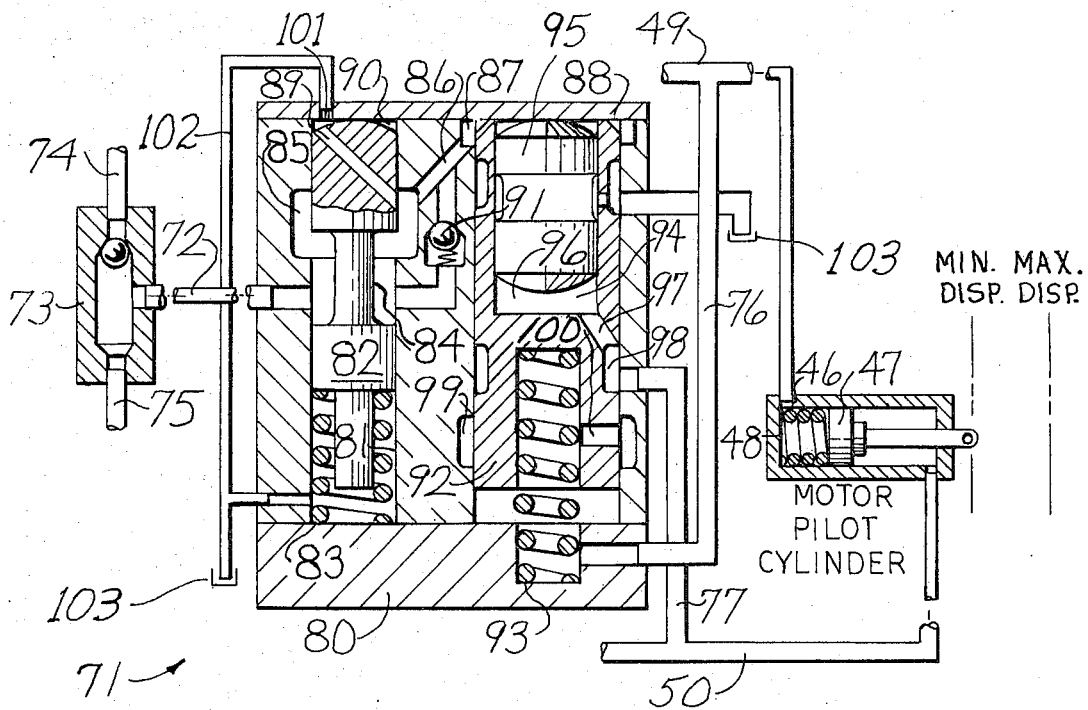
FIG. 2 illustrates a steering responsive valve for the system of FIG. 1.

The steering responsive speed control means, in accordance with the present invention, is best illustrated in FIG. 2. The illustrated apparatus comprises a valve assembly comprising a housing 80 having a first bore 81 in which is reciprocally mounted the control spool 82 biased by means of a spring 83 to one extreme end of the bore 81. The inlet line or conduit 72 communicates with bore 81 and by way of groove 84 of spool 82 with an annulus 85. The annulus 85 communicates by way of a passage 86 with a chamber 87 formed at the end of a second bore 88. The passageway 89 communicates from annulus 85 to chamber 90 at the end of cylindrical bore 81 and valve spool 82. The chamber 90 is provided with a restricted drain port 101 communicating by way of a drain line 102 with sump 103. This port is sufficiently restricted to permit a build up of pressure in chamber 90 communicated thereto via passage 89 to shift spool 82 downward. However, the port permits sufficient drainage from chamber 90 when fluid flow thereto is cut off to prevent a fluid lock of the valve 82. A similar port, without restriction is provided at the lower end to drain leakage therefrom and similarly prevent a fluid lock. A relief valve 91 is interposed between passage 86 and the bore 81. A valve spool 92 is reciprocally mounted in bore 88 and biased to one extreme position by means of a spring 93. The upper end of valve spool 92 is suitably chamfered as shown to permit communication of fluid from chamber 87 to an annular area thereof for biasing the spool downward. A cylindrical bore 94 is formed in valve spool 92 and receives a cylindrical slug member 95 bearing against one end of the bore 88 and forming a chamber 96 between the other end and the valve spool. The slug 95 and spool 92 are each provided with an annular leakage groove, as indicated, communicating via suitable conduit means for draining leakage from any of the spaced pressure chambers to prevent interference between the fluids in the respective chambers. A passageway 97 communicates between the chamber 96 and a groove 98 formed in spool 92. The annular groove 98 communicates with conduit 77 and, upon proper positioning of the spool 92, with an annulus 99 which in turn communicates by way of a passage 100 with the conduit 76. The conduits 76 and 77 communicate with conduits 49 and 50 and thus with opposite sides of the piston 47 of the servo actuator 46. The above described valve means or assembly is operative, as will be described, to provide communication between the two sides of the servo piston 47 and thereby reduce or alter the differential pressure thereby in response to certain conditions to be described.

Figure 3:
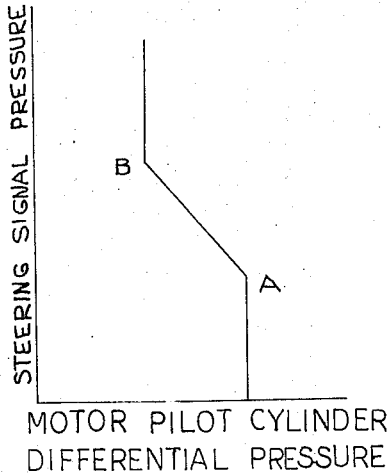
FIG. 3 is a graphic illustration of the pressure relationships for the system of FIG. 1.

Referring now to FIG. 3, there is illustrated a graphic representation of the relationship between the motor pilot cylinder differential pressure and steering signal pressure as provided in accordance with the present invention. Motor pilot cylinder pressure is plotted on the abscissa and steering signal pressure is plotted on the ordinate. This graph in FIG. 3 illustrates that the maximum differential pressure in the pilot cylinder is maintained substantially constant until steering signal pressure approaches or reaches a certain pressure indicated at point A wherein the motor pilot differential pressure begins to drop along the line from A to B as steering signal pressure increases, such that the pilot cylinder differential pressure reaches a minimal operational value B, which then remains constant as steering pressure is further increased. The significance of this will be pointed out in the following discussion of operation of the invention.

For purposes of illustrating the operation of the present invention, assume that the transmissions in the drive system of the vehicle start from the neutral or no-drive position as shown in FIG. 1. The pumps 14 and 22 are slowly advanced to the maximum displacement position by actuation of the servo actuator 35. The motor 16 and 24 are then slowly advanced to their minimum displacement position by actuation of the servo actuator 46 upon pressurization of the hydraulic line 50 such that piston 47 is advanced against spring 48 to its fully retracted position as shown in FIG. 2. This advances the motors 16 and 24 to their minimum displacement positions while the pumps 14 and 22 are at their maximum displacement positions, thus driving the vehicle at its maximum speed. Under these conditions, the vehicle is advancing forward in a straight line at full speed with no steering signal being imposed on the system. Thus, the motor pilot differential pressure, with reference to FIG. 3, would be indicated at a point at the lower end of the vertical line below point A in the graph of FIG. 3.

When the operator desires to turn, or steer the vehicle, he manipulates a steering control (not shown) which actuates or moves a valve (not shown) to pressurize one or another of the steering control lines 62 or 63 to thereby actuate one or the other of the servo actuators 34 or 36. Assume in this instance that the operator desires to turn in a direction such that line 63 is pressurized. This pressure is transmitted to the servo actuator 36 to move the piston and thereby move the servo valve unit 33 to reduce the displacement of pump 22 and thereby slow the drive output to the axle or output shaft 68 of this transmission, resulting in a turn of the vehicle in the direction of this side of the vehicle.

If the operator maintains the steering signal pressure at a point below pressure A as indicated in FIG. 3, the vehicle can negotiate the turn at full speed.

It is assumed, of course, that the steering of the vehicle is almost directly proportional to the steering signal pressure, and thus a gradual turn of the vehicle is signaled when a low pressure is initiated in the system. The pressure in line 62, however, is transmitted by way of line 75 past a shuttle valve 73 along line 72 across valve spool 82 by way of passageway 86 to chamber 87, where it acts on the annular end of piston 92. At the same time, pressure from the speed control system is transmitted by way of line 50 and line 77 to annular groove 98 and by way of passage 97 to the chamber 96 to further act on the piston 92. As long as the pressure from the speed control system acting in chamber 96 and the pressure from the steering control system acting in chamber 87 remain below the pressure imposed by spring 93, the valve 92 will remain in its illustrated position and the steering will have no effect on the speed of the vehicle.

As the operator desires to put the vehicle into a tighter turn, increased movement of the steering control increases the pressure in line 72, and the pressure is transmitted therethrough to the chambers 90, 87, and 96, resulting in a gradual movement of the spools 82 and 92 downward as viewed in FIG. 2. As the steering signal pressure reaches pressure A as indicated in FIG. 3, the spool 92 has moved such that annular groove 98 now comes into communication with annulus 99 such that communication is established between lines 77 and 76, resulting in a by-passing of the pressure from the high pressure side of servo piston 47 to the low pressure side, thereby reducing the differential pressure imposed on piston 47, resulting in a movement thereof in a direction toward the maximum displacement position. This results in actuation of the servo units 37 and 39, and a slewing of the motors 16 and 24 toward their maximum displacement positions, resulting in a reduction in the RPM output from the two transmissions. Continued increase in the steering signal pressure results in a continued decrease in the differential pressure imposed on servo piston 47 and consequently a continued movement thereof with a consequent continued movement of the motors 16 and 24 toward their maximum displacement positions until steering signal pressure reaches point B. As illustrated in FIG. 3, when the steering pressure reaches point B, the differential pressure on piston 47 again becomes constant along straight line upward from point B. As can be seen in FIG. 2, this condition occurs when the spool 82 has moved downward such that the annular groove 84 is completely encompassed in cylindrical bore 82 below annulus 85 such that communication is cut off between lines 72 and passageway 86. This will result in pressure in chamber 90 remaining constant and will restrict any further movement of spool 92 to the right so as to maintain the motors 16 and 24 in a fixed displacement position to obtain the desired torque and RPM ratio.

Spot and pivot turns can thus be accomplished with relative safety and with little waste of power when a vehicle control system incorporates the present invention as disclosed herein. Spot turns are accomplished, with a track drive vehicle, for example, by reversal of one track with respect to the other. Thus, the vehicle turns about its vertical axis while essentially remaining in one spot.

Pivot turns are accomplished by stopping one track while the other continues to drive. This results in the vehicle pivoting about one track.

Both spot and pivot turns are short radius turns and are dangerous to attempt when the vehicle is undergoing substantial speed. The present invention substantially reduces this problem by automatically reducing the vehicle speed when a short radius turn is signaled.

Thus, from the above description and discussion of operation it can be readily seen that there is disclosed a steering responsive drive control valve that is operative to reduce the speed output of hydrostatic transmissions under certain steering conditions to improve both safety and the drive efficiency of the vehicle.

What is claimed is:

1. In a control system for a hydrostatic drive system for an engine driven vehicle having independently driven translation elements, driven from said engine by a pair of infinitely variable hydrostatic transmissions,
   hydraulic control means including a source of pressurized fluid interconnected for coordinated control of said transmissions;
   means responsive to the pressure of said control fluid to control the ratio of said transmissions;
   means for selectively varying said control pressure to said transmissions to vary the output ratio between said transmissions to effect a turning of said vehicle; and,
   means responsive to said turning control pressure and said ratio control pressure to adjust said ratio control in proportion to the sum of said pressures.

2. The invention of claim 1 comprising a pressure responsive valve operative to assume a setting that is proportional to the sum of said pressures.

3. The invention of claim 2 wherein each of said hydrostatic transmissions comprises a variable displacement pump, and a variable displacement motor driven by fluid from said variable displacement pump.

4. The invention of claim 3 comprising linkage means interconnecting said motors to establish position correspondence thereof;
   means interconnecting said pumps to establish position correspondence thereof; and,
   steering control means to alter the position correspondence of said pumps to thereby alter the output of one of said transmissions with respect to the other to thereby effect steering of said vehicle.

5. The invention of claim 4 comprising a piston operatively connected for controlling the displacement of said motors;
   means communicating said speed control fluid to operate said piston; and,
   control means responsive to the sum of said speed control fluid and said steering control fluid for moving said piston to alter the ratio of said transmissions.

6. The invention of claim 5 wherein said piston for controlling the displacement of said motors is responsive to a differential pressure acting thereon; and,
   said means responsive to the sum of said pressures comprises a pressure responsive valve operative to alter said differential pressure.

7. The invention of claim 6 wherein said pressure responsive means comprises a valve spool including a stepped piston operative to alter said differential pressure.

8. The invention of claim 7 wherein said piston includes a first area subject to said speed control fluid pressure and a second area subject to said steering control pressure, the pressure on said areas acting to overcome the bias of a spring to move said piston from a closed position to an open position providing communication between both sides of said piston.

9. The invention of claim 8 comprising another spool subject to said steering control pressure to control communication of said steering control fluid with said second area of said valve piston.

10. In a vehicle drive system including a pair of hydrostatic transmissions operatively coupled to drive separate laterally spaced translation elements, each of said transmissions comprising a variable displacement pump and a variable displacement motor hydraulically interconnected; pressure responsive pump displacement means for varying the displacement of said pumps; pressure responsive motor displacement means for varying the displacement of said motors; a control system including pressurized fluid interconnecting said transmissions for coordinated control thereof; said control system comprising speed control means for simultaneously controlling the displacement of said motors, and for simultaneously controlling the displacement of said pumps, and steering control means operative for selectively and individually controlling the displacement of said pumps to alter the relative output of said transmissions; and means responsive to the combined output of said speed control means and said steering control means to override said speed control means.

11. The invention of claim 10 wherein:
said pump displacement means comprises a pressure responsive fluid actuator for each of said pumps;
said motor displacement means comprises a pressure responsive fluid actuator for each of said motors;
said control meeans comprises a servo valve for each of said actuators;
a plurality of pressure responsive servo actuators for controlling said servo valves;
conduit means for selectively communicating presurized fluid to said servo actuators; and,
pressure responsive valve means communicating with said conduit means and responsive to the sum of control pressure directed to said servo actuators to control the servo actuator of said motors.

12. The invention of claim 10 wherein said combined output responsive means comprises a pressure responsive valve means operative to control said servo actuator for said motors.

13. The invention of claim 12 wherein said pressure responsive valve means comprises a valve spool;
said valve spool including a first piston area responsive to steering control pressure; and,
a second piston area responsive to speed control pressure.

* * * * *